(No Model.)
E. T. WHEELER.
WOODEN PIPE.
No. 517,909. Patented Apr. 10, 1894.
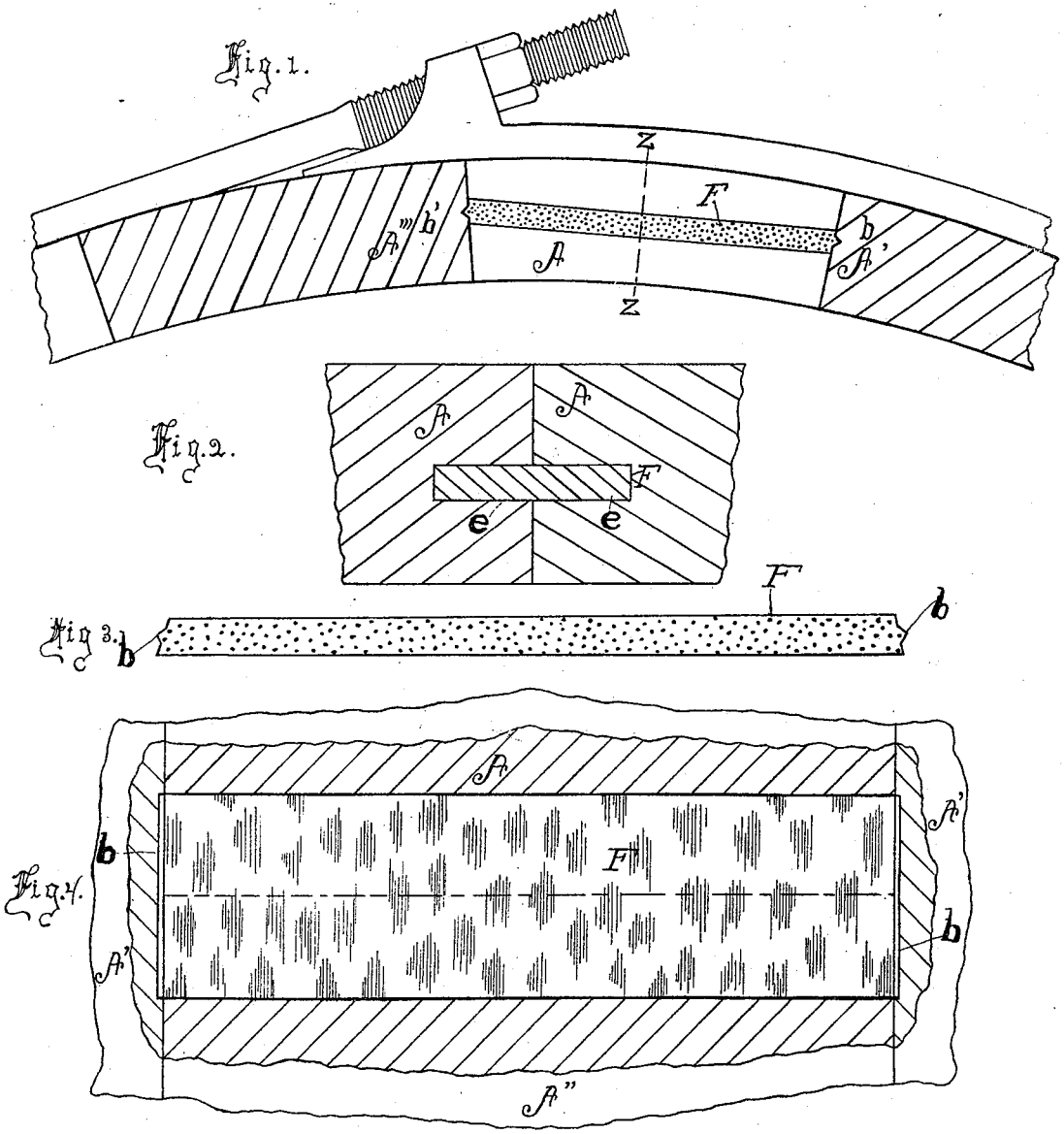

UNITED STATES PATENT OFFICE.

EDGAR T. WHEELER, OF LOS ANGELES, CALIFORNIA, ASSIGNOR TO FRED J. HARRINGTON, OF SAME PLACE.

WOODEN PIPE.

SPECIFICATION forming part of Letters Patent No. 517,909, dated April 10, 1894.

Application filed April 6, 1893. Serial No. 469,346. (No model.)

*To all whom it may concern:*

Be it known that I, EDGAR T. WHEELER, a citizen of the United States, residing at Los Angeles, in the county of Los Angeles and State of California, have invented new and useful Improvements in Wooden Pipes, of which the following is a specification.

The object of my invention is to increase the convenience and facility of manufacturing wooden pipe of the class formed of staves bound together by iron hoops, and at the same time to increase the durability of the pipe and make more complete provision against leakage at the joints.

One of the principal difficulties encountered in building large wooden pipe is the tendency of the pipe to leak at the joints where the ends of the staves are joined together. In handling the staves, the corners of the ends of the staves often become bruised and rounded and if simply butted together will leak so badly as to destroy the utility of the pipe.

Many modes of joining the ends of the staves have heretofore been devised but so far as I am aware they are all defective to a certain degree. One mode of forming a joint is by providing the end of one stave with a tongue and providing a groove in the end of the abutting stave, but this plan possesses the defects of the plan just mentioned in an aggravated degree.

Another device consists of a double dovetail block inserted in dovetail grooves provided in the opposing ends of the staves. This device possesses in addition to the defect above mentioned, the fault of being very expensive and absolutely impracticable in building a pipe in which the ends of the staves are arranged to break joints. This plan is further objectionable for the reason that a great thickness of wood is required to form the dovetails and in order to adapt the dovetail for insertion in its groove it is necessary for the grain of the dovetailed tenon to extend lengthwise of the tenon and by reason of this and the said thickness, the expansion of the tenon when the tenon becomes wet exerts its force to split the stave.

Another device consists of a sheet iron tenon inserted in the grooves provided in the ends of the staves, and projecting outward beyond each side of the stave to engage with the side edge of the adjoining staves and to be forced into such staves when the hoops are tightened, thereby to form a cross joint. I have found in practice that this device possesses two vital defects: in the first place, the ends of the metal tenon are square and blunt, and when they are forced into the edges of the adjoining staves the point of contact between the tenon and the adjoining staves is confined to the square ends of the tenon, the act of forcing the tenon into the stave forming in the wood a depression, the walls of which slope away from the sides of the tenon. Since these tenons are formed of thin sheet metal, it will be readily seen that if the staves are battered or rounded at the corners, there will be a thickness of less than an eighth of an inch of compressed wood in the joint at the end of the metal tenon, to prevent the escape of water from the pipe. This is much less than will prove effective, and where any pressure is placed upon the water, the pipe will leak at the joints. Also, if the pipe is allowed to become dry and is again saturated with water a few times, the wood which is in contact with the unyielding ends of the metal tenons will lose its expansive property to a great extent and will not expand to close the joint perfectly. The second vital defect is that I have found no means of perfectly and cheaply coating the tenon to protect it from rust, and, in a few years the tenons have rusted away and the utility of the pipe is destroyed while the staves are yet intact.

The object of my invention is to provide a joint for connecting the ends of the staves, which will absolutely prevent leakage and will last as long as the staves.

My invention comprises a wooden pipe having the ends of its staves grooved to receive a flat tenon and having a thin, flat tenon of wood fitted in the grooves in the abutting ends of the staves to close the joint between such ends of the staves and arranged with the grain of the tenon parallel with the sides of the staves so that the expansion of the tenon by moisture from the contents of the pipe when the pipe is in use will forcibly cause the ends of the thin tenon to extend from the edges of the staves, and will thus force the ends of the tenon firmly against or into the sides of the staves which abut against the ends of the tenon.

My invention also comprises a wooden pipe having the ends of its staves grooved to receive a flat tenon and having a flat tenon of wood fitted in the ends of the staves to close the joint between the staves and having each end of the tenon provided with a beveled sharp insertion edge arranged projecting beyond the sides of the staves to cut into the adjoining staves when the tube is formed.

It also comprises the pipe having such staves and tenon and having the ends of the tenon beveled to the radius of the pipe and provided with a sharp insertion rib to cut into the adjoining staves when the pipe is formed.

My invention also consists in uniting the staves at their joints by means of a flat hardwood tenon inserted in grooves in the abutting ends of the staves and projecting slightly from the edges of the staves to mesh into the edges of the joining staves, and having the grain of such tenon arranged to extend parallel with the staves so that the expansive force of the wood of the tenon when the tenon becomes wet will cause the tenon to mesh into the staves at the sides of the staves united by such tenon, thereby forming a superior joint for uniting the four staves at the joints.

My invention also comprises other features hereinafter set forth.

The accompanying drawings illustrate my invention. Figure 1 is an end view of a fragment of a wooden pipe embodying my invention. Fig. 2 is a fragmental longitudinal sectional view of two stave ends joined together by my improved means; line z—z Fig. 1 indicates the line of section. Fig. 3 is an end view of my improved tongue or tenon. Fig. 4 is a plan view of the tenon seated in the four staves to form the joint. The staves are broken away to contract the view and expose the tenon.

In the drawings A A' A'' A''' indicate the four staves which form a part of the pipe.

F represents my improved tenon which is preferably made of hard wood and is provided upon each end with a rib f arranged to extend beyond the edges of the staves A A' when the tenon F is inserted in the grooves e provided respectively in the end of the staves. The grain of the tenon F runs parallel with the ribs f and when inserted in the grooves e of the staves E, the grain of the tenon is brought parallel with the grain of the stave. This is highly advantageous for the reason that the expansive force of wood when wet is crosswise of the grain and the tenons are inserted in the stave ends dry, and when the pipe becomes wet the tenons swell equally with the staves and the ribs f are forced or meshed firmly into or against the sides of the staves adjoining the joints between the respective ends of the staves, and thus forms an absolutely tight joint.

While I consider the use of the hard wood tenon preferable, that is to say, a tenon made of harder wood than the staves, still I do not limit my claims to the use of such harder wood tenon for the reason that some soft woods have great expansive powers when wet and this great expansion will accomplish practically the same effect which is accomplished by the hard wood tenon. The use of the wooden tenon greatly increases the efficiency and durability of the wooden pipe upon which it is used, is much cheaper and lighter and will not rust.

I find in practice that the sharp edge of the wooden tenon will become so closely pressed into and incorporated with the fiber of the adjoining staves that an absolutely tight joint is formed in the beveled edges of the tenon cutting into the adjoining staves and forming between the tenon and the stave a fibrous adhesion. I also find in practice that:—since the thickness of the staves is so much greater than that of the tenon, and the staves are held by the bands of the pipe so that lateral extension of the staves by expansion is practically prevented: and since the width of the tenon is so much greater than the thickness thereof: and since the tenon is free to move within the grooves to yield to the expansion by moisture, the lateral extension of the tenon by the expansive force of the moisture is greater than that of the staves and the ends of the tenon are forced outward against the adjoining staves with such power that a tight joint is formed though the ends of the tenon be flat or only moderately pointed. I therefore do not wish my claims to be limited to a tenon provided at its ends with cutting edges.

Now, having described my invention, what I claim as new, and desire to secure by Letters Patent, is—

1. In a wooden pipe the combination of the staves grooved at the ends; the adjoining staves; and the flat expansible wood tenon fitted in the end grooves of the staves and arranged with the grain of the tenon running parallel with the sides of the staves so that the expansion of the tenon caused by moisture will operate to force the ends of the tenon against or into the sides of the adjoining staves.

2. The wooden pipe set forth having the ends of the staves grooved to receive the flat tenon and having a flat wood tenon fitted in the end grooves of the staves to close the joints between the staves; the grain of the tenon running parallel with the axis of the tube, and the ends of the tenon being beveled to the radius of the pipe and provided with the sharp insertion rib projecting beyond the sides of the staves to cut or mesh into the adjoining staves when the tube is formed.

EDGAR T. WHEELER.

Witnesses:
J. H. WATKINS,
ERNEST J. THURSTON.